(12) United States Patent
Son et al.

(10) Patent No.: US 9,360,612 B2
(45) Date of Patent: Jun. 7, 2016

(54) METHOD FOR PRODUCING HIGH-BRIGHTNESS LIGHT-EMITTING FABRIC USING ACRYLIC OPTICAL FIBERS, AND HIGH-BRIGHTNESS LIGHT-EMITTING FABRIC

(71) Applicants: Geum-suk Son, Daegu (KR); Hyun-Chul Lee, Daegu (KR); Seok-ho Yun, Gyeonggi-do (KR); Jae-hoon Jung, Daegu (KR); Hyun-jin Park, Daegu (KR)

(72) Inventors: Geum-suk Son, Daegu (KR); Hyun-Chul Lee, Daegu (KR); Seok-ho Yun, Gyeonggi-do (KR); Jae-hoon Jung, Daegu (KR); Hyun-jin Park, Daegu (KR)

(73) Assignees: Geum-suk Son, Buk-gu Daegu (KR); Hyun-Chul Lee, Buk-gu Daegu (KR); Seok-ho Yun, Anyang-si, Gyeonggi-do (KR)

( * ) Notice: Subject to any disclaimer, the term of this patent is extended or adjusted under 35 U.S.C. 154(b) by 13 days.

(21) Appl. No.: 14/402,788

(22) PCT Filed: Oct. 26, 2012

(86) PCT No.: PCT/KR2012/008884
§ 371 (c)(1),
(2) Date: Nov. 21, 2014

(87) PCT Pub. No.: WO2013/176350
PCT Pub. Date: Nov. 28, 2013

(65) Prior Publication Data
US 2015/0131954 A1 May 14, 2015

(30) Foreign Application Priority Data
May 24, 2012 (KR) .......................... 10-2012-0055451

(51) Int. Cl.
*F21V 8/00* (2006.01)
*D03D 1/00* (2006.01)
(Continued)

(52) U.S. Cl.
CPC *G02B 6/001* (2013.01); *D03D 1/00* (2013.01); *D03D 15/00* (2013.01); *D06C 7/00* (2013.01);
(Continued)

(58) Field of Classification Search
CPC ................................ G02B 6/0101; G02B 6/04
USPC .......................................................... 385/115
See application file for complete search history.

(56) References Cited

U.S. PATENT DOCUMENTS 4,234,907 A * 11/1980 Daniel ........................ 362/556
4,529,426 A * 7/1985 Pleibel et al. ................. 65/403
(Continued)

FOREIGN PATENT DOCUMENTS

| JP | 62206046 A | * | 9/1987 |
| JP | 62-299544 | | 12/1987 |

(Continued)

*Primary Examiner* — Peter Radkowski
(74) *Attorney, Agent, or Firm* — Roberts Mlotkowski Safran & Cole P.C.

(57) ABSTRACT

The present invention relates to a light-emitting fabric, in which acrylic optical fibers and general fibers are woven together, and light is emitted to the surface of the fabric through the optical fibers floating on the surface of the union fabric. According to the present invention, part of the clad portion of the optical fibers is removed by melting so as to prevent the total reflection of the clad portion and to emit high-brightness patterns or characters having a higher brightness than those emitted by optical fibers having a conventional clad portion. Also, a semi-circular core portion is flattened so as to prevent the light from being refracted unnecessarily, and thus the high-brightness light-emitting fabric which can express complex patterns or characters at a higher resolution without emitting environmental pollutants can be provided.

6 Claims, 1 Drawing Sheet

(51) Int. Cl.
*D06C 7/00* (2006.01)
*D06C 15/00* (2006.01)
*G02B 6/04* (2006.01)
*D03D 15/00* (2006.01)

(52) U.S. Cl.
CPC *D06C 15/00* (2013.01); *G02B 6/04* (2013.01); *D10B 2321/08* (2013.01); *D10B 2401/20* (2013.01)

(56) References Cited

U.S. PATENT DOCUMENTS

| | | | | |
|---|---|---|---|---|
| 4,727,603 | A | * | 3/1988 | Howard ............... 2/115 |
| 4,875,144 | A | * | 10/1989 | Wainwright ............... 362/103 |
| 5,183,323 | A | * | 2/1993 | Daniel ............... 362/556 |
| 5,502,785 | A | * | 3/1996 | Wang et al. ............... 385/92 |
| 5,566,267 | A | * | 10/1996 | Neuberger ............... 385/123 |
| 6,535,667 | B1 | * | 3/2003 | Gozum et al. ............... 385/31 |
| 7,274,844 | B2 | * | 9/2007 | Walt et al. ............... 385/38 |
| 7,406,245 | B2 | * | 7/2008 | Page et al. ............... 385/146 |
| 2002/0138120 | A1 | * | 9/2002 | Whitehurst ............... 607/88 |
| 2005/0223464 | A1 | * | 10/2005 | Huang et al. ............... 2/102 |
| 2006/0024017 | A1 | * | 2/2006 | Page et al. ............... 385/146 |
| 2006/0257095 | A1 | * | 11/2006 | Walt et al. ............... 385/147 |
| 2008/0130264 | A1 | * | 6/2008 | Page et al. ............... 362/26 |
| 2013/0236154 | A1 | * | 9/2013 | Page et al. ............... 385/146 |

FOREIGN PATENT DOCUMENTS

| | | | |
|---|---|---|---|
| JP | 01079702 A | * | 3/1989 |
| JP | 02166409 A | * | 6/1990 |
| JP | 06033338 A | * | 2/1994 |
| JP | 2006-039287 | | 2/2006 |
| JP | 2006039287 A | * | 2/2006 |
| KR | 10-0903072 | | 6/2009 |
| WO | WO0212785 | | 2/2002 |

* cited by examiner

METHOD FOR PRODUCING HIGH-BRIGHTNESS LIGHT-EMITTING FABRIC USING ACRYLIC OPTICAL FIBERS, AND HIGH-BRIGHTNESS LIGHT-EMITTING FABRIC

CROSS-REFERENCE TO RELATED APPLICATIONS

This is a US national phase of PCT patent Application No. PCT/KR2012/008884 having an International filing date of Oct. 26, 2012, which claims priority to Korean Patent Application No. 10-2012-00555451, filed on May 24, 2012, the entireties of which are incorporated herein by reference.

FIELD OF THE INVENTION

The present invention relates to a light-emitting fabric which emits light in such a way that acrylic optical fibers and general fiber are woven, and the optical fibers prolonging from the surface of a union fabric are connected to a light source and power unit, and the light irradiated from the light source emits through the optical fibers onto the surface of the woven fabric.

BACKGROUND OF THE INVENTION

Since the optical fiber is able to transmit light in a longitudinal direction, so the use range of the optical fibers extends to optical communication and decoration. In particular, a woven fabric product is made using the optical fibers, and the optical fibers is arranged in the target product in a pattern or a character pattern, and a light emitting device such as a LED lighting and a module configured to drive the light emitting device are disposed inside of the woven fabric.

However the conventional optical fiberwoven fabric uses a basic function wherein a light source is placed at an end portion of the optical fibers and light is transmitted based on the total reflection, and the light emits from the opposite end portion, so there is a limit in arranging the optical fibers when the optical fibers is actually constituted at the product.

The Korean Patent Publication No. 10-2008-0040815 describes a technology wherein scratches or groove are formed on the surface of the optical fibers, so the surface lighting function can be used avoiding the total reflection condition which is the basic principle of the conventional optical fibers. However, in case that the scratches or groove is formed, it becomes hard to uniformly form at a predetermined portion of the optical fibers, so the uniform brightness or luminance of the light irradiating from the optical fiber are impossible to obtain, and unexpected damages may occur at the woven fabric.

In addition, the Korean Patent Registration No. 10-0903072 describes a method for dissolving, using an etching solution, a clad layer of plastic optical fiber arranged at the pattern so as to easily form a predetermined pattern in an easier way using the optical fiber while easily securing the arrangement of the optical fiber. In the prior art, the uniform dissolution of the clad layer may be advantageous, but the etching solution may cause environmental contamination and may harm worker's health. Since the clad portion of the optical fiber prolonging from the surface of the woven fabric as well as the clad portion of the optical fiber prolonging from the interior of the woven fabric or the other side of the woven fabric may be also melted, so light emission may occur even from the unnecessary portions, for which there may have unnecessary loss in quantity of light.

DETAILED DESCRIPTION OF THE INVENTION

Accordingly, the present invention is made in an effort to resolve the problems of the conventional art. It is an object of the present invention to provide an environmentally friendly method which is characterized in that the brightness or luminance of the light irradiated from the optical fibers may be made uniform based on the uniform process with respect to the optical fibers prolonging from the surface of the woven fabric, and any unnecessary loss of quantity of light may be minimized by preventing light emission from unnecessary portions, and the light emitting woven fabric may not cause environmental contamination and may not harm worker's health.

To achieve the above object, there is provided a method for producing a high brightness light emitting fabric using acrylic optical fibers, which includes a weaving process for producing a union fabric by weaving an acrylic optical fibers formed of a clad part and a core part, and a general fiber; and a heat treatment process for melting a partial cross section of the clad portion of the acrylic optical fibers prolonging from the surface of the union fabric by heat-treating the union fabric while pressurizing with a roller or a press of 100~250° C. and flattening and exposing the core part.

Hereinafter, the present invention will be described in detail.

The present invention is directed to a high brightness light emitting fabric which is characterized in that acrylic optical fibers and general fibers are woven together, and the optical fibers protrude or prolong so that a predetermined pattern or character may be formed on the surface of the thusly woven union fabric, and the other end portions of the optical fibers are connected to a light source and power unit, whereby the high brightness light irradiated from the light source may emit through the optical fibers onto the surface of the woven fabric.

In particular, in the present invention, a partial cross section of a clad part of an acrylic optical fiber formed of a clad part and a core part is melted by heat-treating the acrylic optical fibers prolonging from the surface of the union fabric in the union fabric which is made by weaving the acrylic optical fibers and the general fibers, and the core part is exposed in a flat shape.

Figure 1:
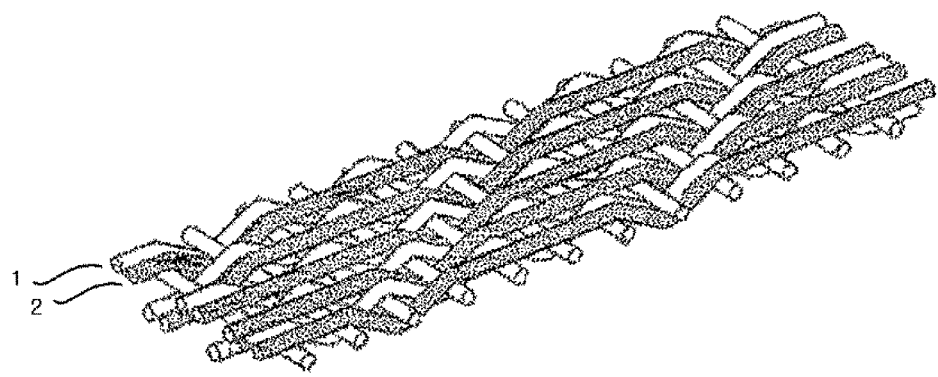
FIG. 1 is a perspective view illustrating a high brightness light emitting woven fabric using an acrylic optical fiber according to an exemplary embodiment of the present invention.

First, in a weaving process, a union fabric as illustrated in FIG. 1 is made by weaving an acrylic optical fiber formed of a clad part and a core part, and general fiber. Here, the union fabric is made by arranging at a predetermined ratio the general fiber 1 and the acrylic optical fiber 2 with respect to any one or both of a warp and a weft. At this time, the light emitting patterns or characters of the light emitting fabric of the present invention are determined based on the arrangement of the acrylic optical fibers prolonging from the surface which is determined as the surface.

As for the kinds of the union fabrics, any tissue such as a plain weave, a twill weave, a jacquard weave, etc. may be used. In addition, there may be a way of forming a predetermined pattern through an embossing process or a press process with respect to a union fabric made using optical fibers as a whole or a woven type fabric woven using only optical fibers, and a jacquard woven fabric may be better wherein the prolonging optical fiberportions are continuous so as to secure clear patterns or characters and various patterns. In much better way, the patterned portions may be better expressed since the optical fibers prolong from the surface potion of the Uragiri (Japanese term which means the type wherein the threads protruding from the other side of the woven fabric) jacquard woven fabric wherein the common threads are cut off while leaving only the optical fibers behind.

The clad portion of the acrylic optical fiber is melted and removed by heat-treating the union fabric, wherein the heat treatment is performed while pressurizing with a roller or a press of 100~250° C.

Figure 2:
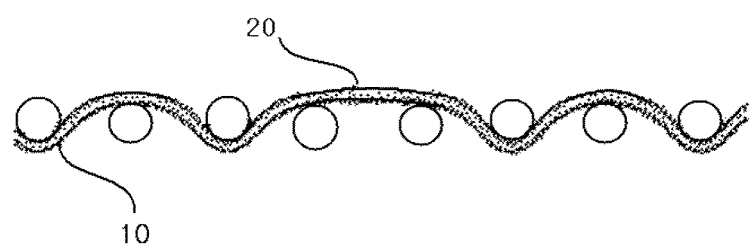
FIG. 2 is a cross sectional view illustrating a high brightness light emitting woven fabric using an acrylic optical fiber according to an exemplary embodiment of the present invention.
Figure 3:
FIG. 3 is a photo showing that light is irradiated when a power unit is installed at a high brightness light emitting woven fabric using an acrylic optical fiber according to an exemplary embodiment 1 of the present invention.
Figure 4:
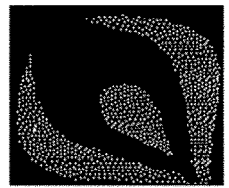
FIG. 4 is a photo showing an occasion where light is irradiated when a power unit is installed at a light emitting woven fabric which is not heat-treated in a comparison example 1.

Partial cross sections of the clad part 10 of the acrylic optical fiber prolonging from the surface of the union fabric, as illustrated in FIG. 2, through the heat treatment is melted, and the core part 20 is processed to be exposed in a flat shape.

Since the acrylic optical fibers in general includes a core layer formed of a PMMA which is an acrylic polymer and a clad part formed of a fluoridation PMMA covering the core layer, wherein the light inputted into the core part is totally reflected for thereby performing optical transmission. The present invention however is characterized in that the light is made to scatter from the inside of the core to the outside in such a way to prevent the total reflection operation of the clad part at a corresponding portion by removing part of the clad part by a melting method. Thanks to the light which is thusly scattered and emitted to the outside of the optical fiber, it becomes possible to emit higher brightness pattern or character than the luminance in the optical fiber which has the typical clad part.

In addition, the present invention is characterized in that the clad part is removed by melting, and the semicircular core part close to the clad part which is removed is flattened, so the light is unnecessarily refracted, which would result in higher resolution than the complicated patterns or characters.

It is preferred that the diameter of the exposed core portion of the acrylic optical fibers during the heat treatment process is 20~80% of the diameter of the whole acrylic optical fibers. In case that the diameter of the exposed core part is less than 20% of the diameter of the whole acrylic optical fibers, it is hard to secure the total reflection attenuation effect from the removal of the clad, and in case that the diameter of the exposed core part is in excess of 80% of the diameter of the whole acrylic optical fibers, the quantity of light increases, but enough quantity of light does not reach the optical fiber section far from the light source due to the excess loss of quantity of light at the optical fiber section close to the light source, so it is hard to secure the revelation of the uniform luminance of the whole patterns or characters.

The present invention provides a high brightness light emitting woven fabric using an acrylic optical fiber based on a preparation method of a high brightness light emitting woven fabric of the present invention, which woven fabric is characterized in that the clad portion of the acrylic optical fibers prolonging from the surface part of the woven fabric is removed, and a flat core part is exposed.

Advantageous Effects

The present invention therefore is characterized in that part of the clad portion of the optical fibers is removed by melting, thus preventing the total reflection operation of the clad part at a corresponding portion, and light scatters from the inside of the core part to the outside for thereby irradiating high luminance patterns or characters than the luminance of the optical fiber which has a typical clad part. In addition, it is possible to provide high luminance light emitting woven fabric, without discharging any environmental contamination substances, which may express the complicated patterns or characters in higher resolutions since the light is not unnecessarily refracted in such a way to flatten the semicircular core part.

MODE FOR INVENTION

The following exemplary embodiment of the present invention provides a non-limited example with respect to a method for producing a high brightness light emitting woven fabric using an acrylic optical fiber of the present invention.

Exemplary Embodiment 1

A jacquard woven fabric is woven by arranging a polyester fiber (50d/36fila) as a warp, and an acrylic optical fiber at a ratio of 1:1, and the surface part of the jacquard woven fabric is heat-treated while pressurizing it with a roller of 180° C., so the clad portion of the acrylic optical fibers prolonging from the surface of the woven fabric is melted and removed, and the top of the core part is flattened in order for the diameter of the exposed core part of the acrylic optical fibers to be 60% of the diameter of the whole acrylic optical fibers.

Comparison Example 1

The jacquard woven fabric is woven in the same manner as the exemplary embodiment 1 except for that the heat treatment is not performed in the exemplary embodiment 1.

| [Legend of Reference Numbers] | |
| --- | --- |
| 1: General fiber | 2: Acrylic optical fibers |
| 10: Clad part | 20: Core part |

We claim:
1. A method for producing a high brightness light emitting fabric using acrylic optical fibers, comprising:
   a weaving process for producing a fabric by weaving an acrylic optical fiber formed of a clad part and a core part, and a general fiber; and
   a heat treatment process for melting a partial cross section of the clad part of the acrylic optical fiber protruding from a surface of the fabric by heat-treating the fabric while pressurizing with a roller or a press of 100~250° C. and flattening and exposing the core part,
   wherein in the heat treatment process the diameter of the exposed core part of the acrylic optical fibers is 20~80% of the diameter of the whole acrylic optical fibers.
2. The method of claim 1, wherein the fabric is an Uragiri jacquard woven fabric.

3. A high brightness light emitting woven fabric using acrylic optical fibers, comprising:
a flat core part which is exposed, wherein a clad portion of an acrylic optical fiber protruding from a surface portion of the woven fabric is removed.

4. A method for producing a high brightness light emitting fabric, comprising:
weaving an acrylic optical fiber comprising a clad portion and a core portion, and a general fiber, to produce a fabric having a surface comprising a portion of the acrylic optical fiber portion protruding from at least a portion of the surface; and
heat-treating the fabric under pressure at a temperature of from 100° C. to 250° C. to remove a partial cross-section of a clad portion of the protruding portion of the acrylic optical fiber, comprising
melting the partial cross-section to produce an exposed core portion, and
flattening the core portion, to produce a flattened exposed core portion having a diameter that is from 20% to 80% of the diameter of the acrylic optical fiber prior to heat-treating.

5. The method of claim 4, wherein heat-treating the fabric under pressure comprises rolling or pressing the fabric under pressure.

6. A high brightness light emitting woven fabric, comprising:
a plurality of substantially round acrylic optical fibers, each comprising a core portion and a clad portion provided over at least a portion of the core portion; and
a plurality of general fibers woven with the acrylic optical fibers to produce a fabric having a surface,
wherein at least a portion of the surface comprises a plurality of exposed flattened core portions, each exposed flattened core portion having a diameter that is from 20% to 80% of the diameter of an acrylic optical fiber comprising a core portion and a clad portion provided over the core portion.

* * * * *